(No Model.)

C. F. TAYLOR & H. D. BRADBURN.
RAG DUSTER.

No. 428,429. Patented May 20, 1890.

UNITED STATES PATENT OFFICE.

CHARLES F. TAYLOR, OF SPRINGFIELD, AND HENRY D. BRADBURN, OF HOLYOKE, ASSIGNORS TO SAID TAYLOR, AND CHAS. H. HEYWOOD AND HERBERT J. FRINK, OF HOLYOKE, MASSACHUSETTS.

RAG-DUSTER.

SPECIFICATION forming part of Letters Patent No. 428,429, dated May 20, 1890.

Application filed December 20, 1884. Renewed January 9, 1890. Serial No. 336,355. (No model.)

*To all whom it may concern:*

Be it known that we, CHARLES F. TAYLOR, of Springfield, Hampden county, Massachusetts, and HENRY D. BRADBURN, of Holyoke, in said county and State, citizens of the United States, have jointly invented new and useful Improvements in Rag-Dusters, of which the following is a specification, reference being had to the accompanying drawings.

Our invention relates to machinery for the manufacture of paper.

Heretofore in the treatment of rags for paper-stock the rags after being cut have been partially cleaned by being passed through a rotary sieve of the usual construction, in the manner hereinafter pointed out. This operation is termed "dusting." Now in order to properly separate the foreign matter usually found in the stock at this stage, which consists of dust, bits of straw, buttons, hooks and eyes, &c., it has been found necessary to pass the stock through two or more sets of dusters having meshes or openings of different sizes, the stock, after passing through one sieve, being conveyed to another of like construction. This causes a loss of time, and the constant beating, pounding, or moving of the mass of rags in the sieves cause the edges of the pieces of cloth to fray out, a large amount of fiber is thrown off and lost, and it is found that this loss will result to a greater or less extent so long as the mass of rags are disturbed or moved. To avoid this loss in many cases one duster having a large mesh or opening has been used. This is objectionable, as small pieces of cloth (termed "chips") will pass through the meshes of the sieve with the foreign matter, and thus becoming mixed with it the chip will be lost. Thus it will be seen that a loss of stock results if either of the old methods be pursued.

The object of our invention is to save the waste which has heretofore resulted from the old methods of treating the stock, and to provide a simple, easily-operative, and effective apparatus which shall produce the desired result; and our invention consists in the apparatus hereinafter described, whereby the objectionable features in the old methods are obviated and the objects of our invention are attained.

Figure 1:
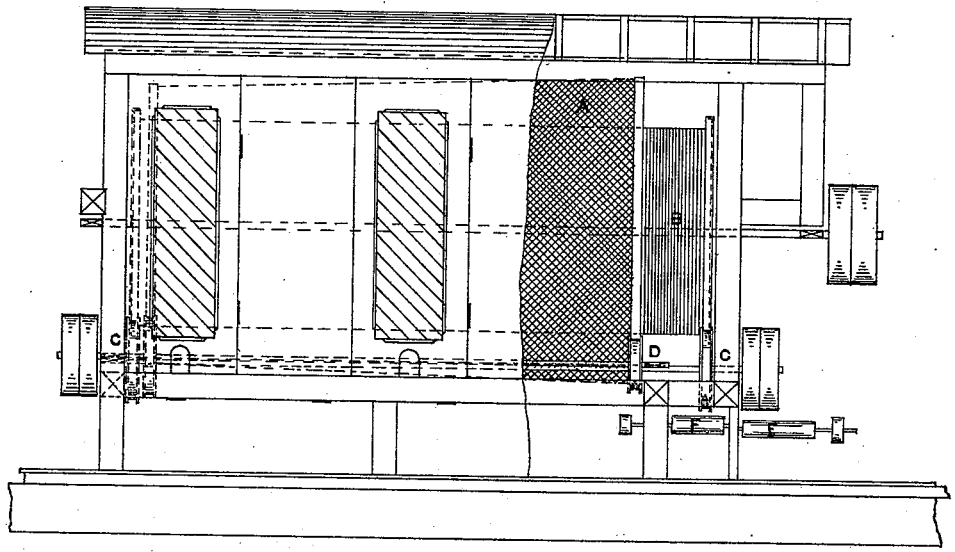
Figure 2:
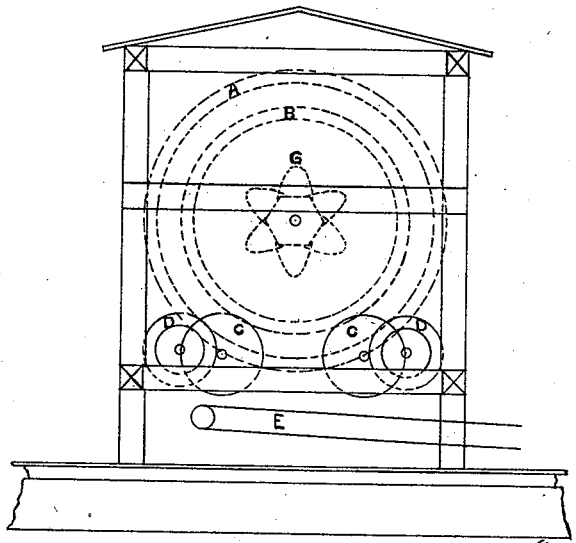

In the accompanying drawings, in which similar letters of reference indicate like parts, Figure 1 is a side elevation of our device having a portion of the casing broken away, and Fig. 2 is an end view of the device.

In the construction of our apparatus we arrange two or more independent rotary sieves, one within the other, in such manner that the material passing through the meshes of one sieve will fall directly to the next sieve, and thus a great amount of tumbling be avoided. The inner sieve has a large opening or mesh and the one next to it has a smaller mesh, so that foreign matter, either large or small, will readily pass through the meshes of the first sieve, and the stock remaining therein will be readily cleansed while passing through this one inner sieve.

We prefer to construct the inner sieve of rods which run around the circumference of the sieve, separated about three-eighths of an inch, though this construction may be varied and the beneficial result be accomplished.

The chip or small pieces of stock which pass through the mesh of the first sieve with the foreign matter will be gradually deposited upon the second sieve and the foreign matter will more readily escape and pass through the mesh than it would were the stock and refuse deposited in a mass. The operation of the second sieve causes the separation of the smaller particles of objectionable matter from the stock therein, leaving the chip mixed only with the large-sized impurities. In this condition the chip can be overlooked and separated from the foreign matter with comparative ease, while if the chip were mixed with the whole mass of dust and dirt which passes through the first sieve it would not be practicable to separate it therefrom.

It will be readily seen that several sieves may be employed with meshes of varying sizes, and that the process of separation be thus subdivided, as may be found practicable.

The stock is fed into the inner sieve at one end in the usual manner and passes out at the opposite end, where it is received upon an apron E and deposited at the desired point. An apron F is also provided to receive the stock delivered by the outer sieve and convey it to the place desired. The sieves are independent of each other, so that the rapidity or direction of the motion of each may be altered or controlled independently of the other.

We are aware that machines for winnowing or cleaning grain have heretofore been made having a double revolving-sieve cylinder or an inner and outer cylinder united to each other and revolving together, and we make no claim to such construction. Our sieve-cylinders are independently operating, and may be revolved in opposite directions or with different velocity.

Having therefore described our invention, what we claim, and desire to secure by Letters Patent, is—

1. A rag-duster machine comprising an inner rotatable cylindrical sieve B, a carrying-apron E to receive the discharged contents of the said sieve, an outer larger rotatable cylindrical sieve A, and a carrying-apron F to receive the discharged contents of the said sieve A, said sieves being mounted on a common axis and arranged thereon to have independent rotation, substantially as described.

2. A rag-duster machine comprising an inner rotatable cylindrical sieve B, consisting of circumferentially-arranged rods, an outer and larger rotatable cylindrical sieve A, having independent bearings on the shaft of the inner sieve, and carrying-aprons E F, arranged to receive and convey the discharged contents of the respective sieves, substantially as shown and described.

CHARLES F. TAYLOR.
HENRY D. BRADBURN.

Witnesses to C. F. Taylor:
ALLEN WEBSTER,
JOHN SHARROCKS.

Witnesses to H. D. Bradburn:
L. F. HAYWARD, Jr.,
WM. H. HEYWOOD.